United States Patent
Clapper et al.

(10) Patent No.: US 11,441,714 B2
(45) Date of Patent: *Sep. 13, 2022

(54) SYSTEM, METHOD AND APPARATUS FOR RAMPED RETAINER FOR A PIPE

(71) Applicant: North American Pipe Corporation, Houston, TX (US)

(72) Inventors: Joshua E. Clapper, Dowington, PA (US); Dmitry Yashin, Haverford, PA (US); Roy L. Dean, Schwenksville, PA (US)

(73) Assignee: NORTH AMERICAN PIPE CORPORATION, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/995,154

(22) Filed: Aug. 17, 2020

(65) Prior Publication Data
US 2021/0003237 A1    Jan. 7, 2021

Related U.S. Application Data

(63) Continuation of application No. 15/893,129, filed on Feb. 9, 2018, now Pat. No. 10,746,335.

(60) Provisional application No. 62/459,040, filed on Feb. 14, 2017.

(51) Int. Cl.
| | | |
|---|---|---|
| F16L 37/088 | (2006.01) | |
| F16L 37/091 | (2006.01) | |
| F16L 37/092 | (2006.01) | |

(52) U.S. Cl.
CPC ........... *F16L 37/088* (2013.01); *F16L 37/091* (2013.01); *F16L 37/092* (2013.01)

(58) Field of Classification Search
CPC . F16L 37/092; F16L 37/0927; F16L 37/0925; F16L 37/091
See application file for complete search history.

(56) References Cited

U.S. PATENT DOCUMENTS

| | | |
|---|---|---|
| 239,827 A | 4/1881 | Newman |
| 2,346,051 A | 4/1944 | Cecil |
| 2,914,344 A | 11/1959 | Anthes |
| 2,922,665 A * | 1/1960 | Beyer .................. F16L 17/035 285/105 |
| 3,381,983 A | 5/1968 | Hanes |
| 3,389,923 A | 6/1968 | Love, Jr. |
| 3,447,819 A | 6/1969 | Borsum |
| 3,532,367 A | 10/1970 | Roos |
| 3,585,803 A | 6/1971 | Bardgette |
| 3,692,336 A | 9/1972 | Zon |
| 3,712,648 A | 1/1973 | Clifford |
| 3,773,360 A | 11/1973 | Timbers |
| 4,105,226 A | 8/1978 | Frey |

(Continued)

*Primary Examiner* — David Bochna
(74) *Attorney, Agent, or Firm* — Lempia Summerfield Katz LLC

(57) ABSTRACT

A pipe system has a pipe with an axis and a retainer groove formed in an exterior of the pipe near an axial end of the pipe. The pipe system also has a tubular body with an interior and one end sized to receive the axial end of the pipe therein to form a pipe assembly. The pipe system also has a retainer configured to be received in the retainer groove and to be both axially movable and radially movable relative to the retainer groove during formation of the pipe assembly and to retain the pipe and the tubular body in the pipe assembly.

20 Claims, 4 Drawing Sheets

(56) References Cited

U.S. PATENT DOCUMENTS

| | | |
|---|---|---|
| 4,209,193 A | 6/1980 | Ahlstone |
| 4,471,978 A | 9/1984 | Kramer |
| 4,603,886 A | 8/1986 | Pallini, Jr. |
| 5,176,413 A | 1/1993 | Westman |
| 5,662,360 A | 9/1997 | Guzowski |
| 5,709,415 A | 1/1998 | Witter |
| 5,813,705 A | 9/1998 | Dole |
| 7,097,211 B2 | 8/2006 | Adams |
| 7,284,310 B2 | 10/2007 | Jones |
| 7,537,248 B2 | 5/2009 | Jones |
| 8,342,579 B2 | 1/2013 | Hennemann |
| 8,814,219 B2 | 8/2014 | Hennemann |
| 2012/0217738 A1 | 8/2012 | King |
| 2016/0169431 A1 | 6/2016 | King |

* cited by examiner

SYSTEM, METHOD AND APPARATUS FOR RAMPED RETAINER FOR A PIPE

This application is a continuation of, and claims the priority benefit of, U.S. patent application Ser. No. 15/893,129, now U.S. Pat. No. 10,746,335, filed on Feb. 9, 2018 and entitled "SYSTEM, METHOD AND APPARATUS FOR RAMPED RETAINER FOR A PIPE", and which claims the priority benefit of U.S. Provisional Patent Application No. 62/459,040, filed Feb. 14, 2017. The entirety of each of these prior filed applications is hereby incorporated herein by reference.

BACKGROUND

Field of the Disclosure

The present invention relates in general to pipes and, in particular, to a system, method and apparatus for a ramped retainer for pipe assemblies.

Description of the Prior Art

Conventional spline-type, restrained pipe joint systems typically have splines that are separate from the pipes. The splines can be lost during transportation or disassembly. Examples of such designs include U.S. Pat. Nos. 5,662,360, 7,284,310, and 7,537,248. There are no "push to lock" type pipe joints that rely on a spline that automatically "expands" to open, and then snaps into place. Some users would prefer a quicker installation of restrained joint pipe that does not require "reversibility" (i.e., the ability to take the joint apart after assembly), and yet still provide a robust pipe joint system. Thus, improvements in pipe restrained joints continue to be of interest.

SUMMARY

Embodiments of a system, method, assembly and apparatus for a ramped spline are disclosed. For example, a pipe assembly can include a pipe body having an axis and a spline groove formed in an exterior of the pipe body. A spline can be mounted in the spline groove. In some versions, an entirety of the spline can be configured to be both axially movable and radially movable relative to the spline groove during formation of a pipe assembly with a tubular body.

In an alternate embodiment, a pipe system can include a pipe having an axis, an exterior, and a pipe spline groove formed in the exterior. A spline can be mounted in the pipe spline groove. In some versions, an entirety of the spline is configured to be both axially movable and radially movable relative to the pipe spline groove during formation of a pipe assembly. A tubular body having an interior can be configured to receive the pipe. The tubular body can include a tubular body spline groove configured to receive at least a portion of the spline when the pipe assembly is formed. The tubular body can comprise another pipe or a coupling.

Embodiments of a method of forming a pipe assembly can include: providing a pipe with an axis, an exterior, and a pipe spline groove formed in the exterior; mounting a spline in the pipe spline groove; inserting the pipe into an interior of a tubular body until the pipe spline groove axially aligns with a tubular body spline groove in the tubular body, such that at least a portion of the spline extends into the tubular body spline groove; and then axially removing at least a portion of the pipe from the tubular body such that an entirety of the spline moves both axially and radially relative to the pipe spline groove.

Still other embodiments can include a pipe system having a pipe with an axis, an exterior and a pipe spline groove formed in the exterior. A spline can be mounted in the pipe spline groove. The spline can include a base and a tail extending from a radial outer surface of the base. The pipe system includes a tubular body having an interior and a tubular body spline groove formed in the interior. The tubular body can be configured to form a pipe assembly with the pipe. The tail of the spline can be configured to radially extend from the base prior to the pipe contacting the tubular body. The tail of the spline can be configured to radially collapse toward the base after the pipe contacts the tubular body but prior to the tail reaching the tubular body spline groove. In addition, the tail of the spline can be configured to again radially extend from the base when the tail axially aligns with the tubular body spline groove. The tail of the spline also can be configured to again radially collapse toward the base when tension is applied between the pipe and the tubular body.

An embodiment of a pipe can include a pipe body having an axis, a spline groove formed in an exterior of the pipe body, and the spline groove is configured to receive a spline. The spline groove can consist of: a major radial surface that is not parallel to the axis, and a radial shoulder on each axial end of the major radial surface that is configured to impede axial motion of the spline when contact is made between the spline and one of the radial shoulders.

The foregoing and other objects and advantages of these embodiments will be apparent to those of ordinary skill in the art in view of the following detailed description, taken in conjunction with the appended claims and the accompanying drawings.

BRIEF DESCRIPTION OF THE DRAWINGS

So that the manner in which the features and advantages of the embodiments are attained and can be understood in more detail, a more particular description can be had by reference to the embodiments thereof that are illustrated in the appended drawings. However, the drawings illustrate only some embodiments and therefore are not to be considered limiting in scope as there can be other equally effective embodiments.

The use of the same reference symbols in different drawings indicates similar or identical items.

DETAILED DESCRIPTION

Figure 1:
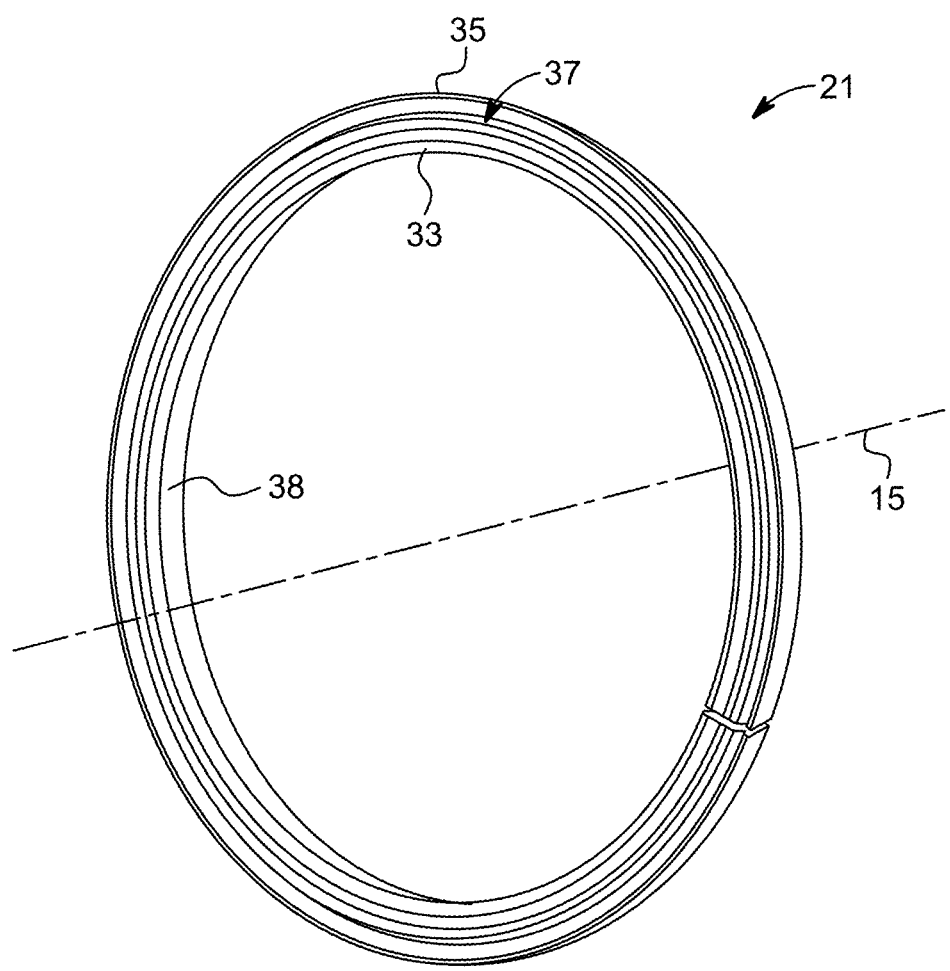
FIG. 1 is a rear isometric view of an embodiment of a spline.
Figure 2:
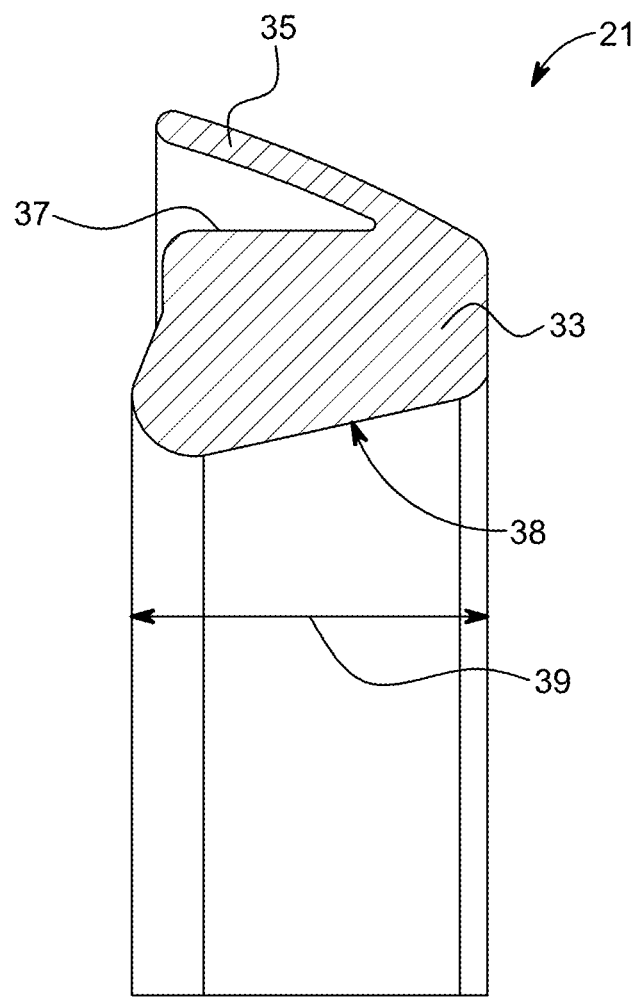
FIG. 2 is a sectional side view of the spline of FIG. 1.

Embodiments of a system, method, assembly and apparatus for a ramped retainer for a pipe are disclosed. For example, a retainer, such as a spline 21, can comprise a split ring having an axis 15. Spline 21 can include a base 33 (FIGS. 1 and 2) and a tail 35 extending from a radial outer surface 37 of the base 33. In one version, the radial outer surface 37 can be parallel to axis 15. The tail 35 of the spline 21 can be configured to extend radially from the base 33. The tail 35 also can be configured collapse radially (relative to axis 15) toward radial outer surface 37 of the base 33 during assembly, as will be described herein.

Versions of spline 21 can include a radial inner surface 38 opposite the radial outer surface 37. In some examples, the radial inner surface 38 can be tapered, such that it is not parallel to axis 15 and radial outer surface 37. In one version, an entirety of the radial inner surface 38 of the spline 21 is tapered at a single (i.e., only one) slope. The slope can be defined as the radial change in dimension divided by the axial change in dimension. In one example, the radial inner surface 38 is the only radially inner surface of the spline 21 and extends for an entire axial length 39 of the spline 21.

Figure 3:
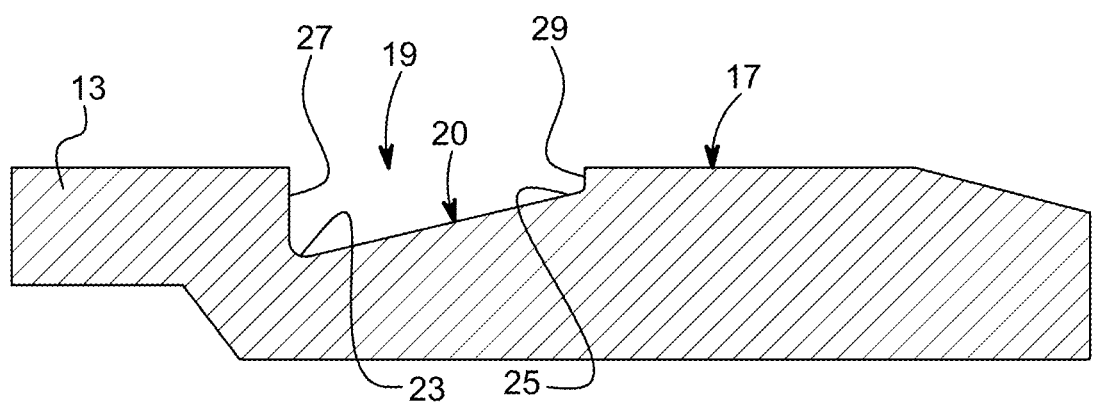
FIG. 3 is a sectional side view of an embodiment of a spline on a pipe.
Figure 4:
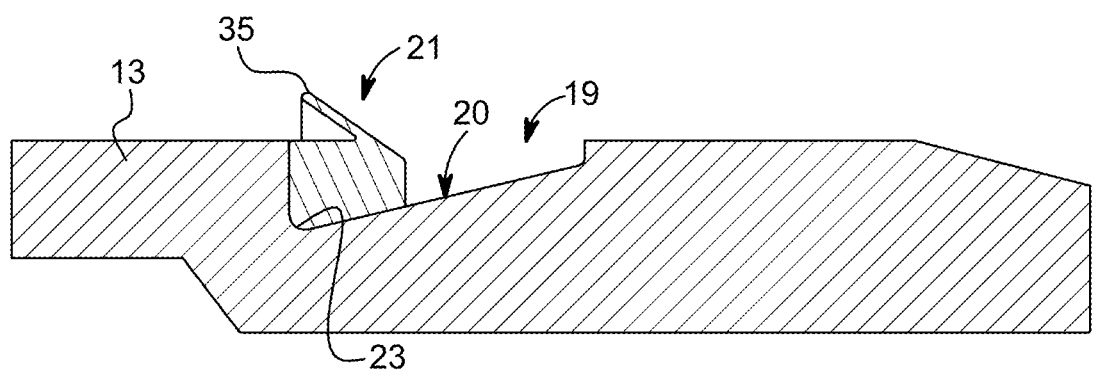
FIG. 4 is a sectional side view of an initial stage of assembly for an embodiment of a pipe assembly.

FIG. 3 discloses an outer portion of one embodiment of a pipe 13 having a pipe spline groove 19. Pipe 13 can be coaxial with the axis 15 when spline 21 is mounted to pipe 13. Pipe 13 comprises an exterior 17 and the pipe spline groove 19 is formed in and circumscribes the exterior 17. This geometry can be formed adjacent one or both axial ends of pipe 13.

Versions of the pipe spline groove 19 can include a plurality of radial depths relative to the axis 15. In an example, the pipe spline groove 19 can include a major surface or bottom 20 having a deepest radial depth 23 located farthest from the axial end, and a shallowest radial depth 25 located axially between the axial end and the deepest radial depth 23. The deepest radial depth 23 is greater than the shallowest radial depth 25. In one version, at least a portion of the bottom 20 is tapered. In another version, an entirety of the bottom 20 is tapered. In still another version, the entirely of the bottom 20 is tapered at a single (i.e., only one) slope. In addition, the pipe spline groove 19 can include shoulders 27, 29 facing axially toward each other on opposite sides of bottom 20. Shoulders 27, 29 can extend in a radial direction (relative to axis 15), and the shoulders 27, 29 can be parallel to each other and perpendicular to axis 15. Thus, each shoulder 27, 29 can be characterized as a radial shoulder that faces in an axial direction.

FIGS. 4-7 depict a sequence of assembly steps for an embodiment of a pipe system 11. Pipe system 11 can include the pipe 13 and spline 21 mounted in the pipe spline groove 19, such as to form a pipe sub-assembly comprising the pipe 13 and spline 21. A tubular member or body 51, such as another pipe or a coupling, can include an interior 53 configured to receive the pipe 13. The tubular body 51 can include a tubular body spline groove 55 configured to receive at least a portion of the spline 21. In one version, the pipe spline groove 19 can include an axial length 57 that is greater than the axial length 59 of the tubular member spline groove 55. In an embodiment, an entirety of the spline 21 can be configured to be both axially movable and radially movable (i.e., in a direction perpendicular to axis 15) relative to the pipe spline groove 19 during formation of the pipe assembly.

In some embodiments, the tail 35 of the spline 21 can be configured to radially extend (FIG. 4) from the base 33 prior to the pipe 13 contacting the tubular body 51. This is an expanded configuration for the spline 21, having an expanded diameter relative to the axis 15 prior to formation of the pipe assembly. In some versions, the tail 35 of the spline 21 can be configured to radially collapse (FIG. 5) toward the base 33 after the pipe 21 contacts the tubular body 51, but prior to the tail 35 reaching the tubular body spline groove 55. This is a collapsed configuration having a collapsed diameter relative to the axis 15 prior to formation of the pipe assembly. Pipe 13 also can have a seal groove 18 for a seal, such as an o-ring.

In operation (FIG. 5), the spline 21 can have an initial, outer collapsed radius ($R_1$), relative to axis 15, that is greater than or equal to a bore radius ($R_B$) of tubular body 51. In addition, the spline 21 can include an initial, inner radius ($R_2$) that is less than or equal to the bore radius ($R_B$). In a subsequent step of operation (FIG. 6), the spline 21 can have an outer, expanded radius ($R_3$) that is greater than or equal to the bore radius ($R_B$). At this stage the spline 21 also can have an inner radius ($R_4$) that is less than or equal to the bore radius ($R_B$). During a final stage of assembly (FIG. 7), the spline 21 can include a final, outer collapsed radius ($R_5$) that is greater than or equal to the bore radius ($R_B$), and the spline 21 can have an inner radius ($R_6$) that is less than or equal to the bore radius ($R_B$).

Figure 6:
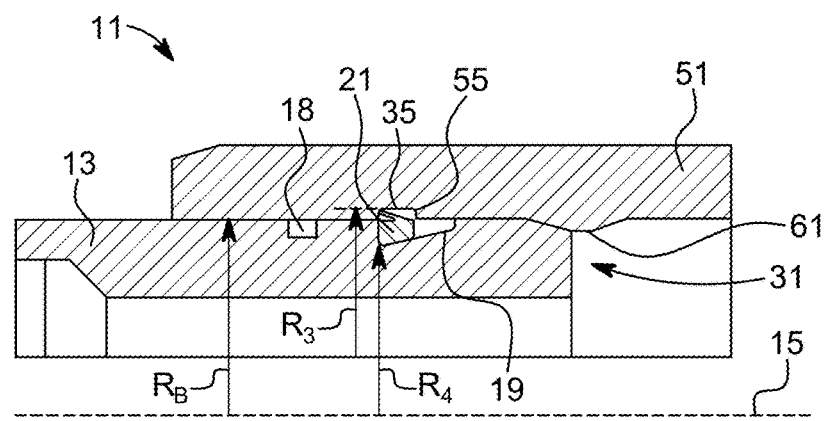
FIG. 6 is a sectional side view of a final stage of assembly for the pipe assembly of FIG. 5.
Figure 7:
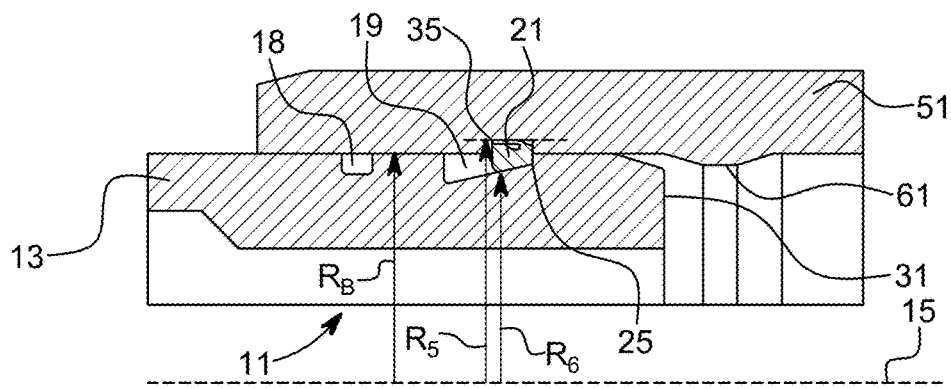
FIG. 7 is an enlarged sectional side view of an outer portion of an embodiment of a pipe having a spline groove.

As shown in FIG. 6, the tail 35 of the spline 21 can be configured to again radially extend from the base 33 when the tail 35 axially aligns with the tubular body spline groove 55. This is another expanded configuration, which can comprise the expanded diameter relative to the axis 15 during formation of the pipe assembly. The expanded diameter of the spline 21 is greater than the collapsed diameter of the spline 21. In addition, the tail 35 of the spline 21 can be configured to again radially collapse (FIG. 7) toward the base 33 when tension is applied between the pipe 13 and the tubular body 51. This is another collapsed configuration, which can comprise the collapsed diameter after formation of the pipe assembly.

As previously noted, the radial inner surface 38 of the spline 21 is not necessarily parallel to the axis 15. In some versions, the radial inner surface 38 of the spline 21 is not parallel to the axis 15 before (FIG. 4), during (FIGS. 5 and 6) and after (FIG. 7) the pipe assembly is formed by the pipe 13, spline 21 and tubular member 51. Again, the radial inner surface 38 of the spline 21 can be the only radial inner surface of the spline 21. The entire axial length 39 of the only radial inner surface 38 of the spline 21 can be co-planar with a bottom surface 20 (FIGS. 3 and 4) of the pipe spline groove 19 before (FIG. 4), during (FIGS. 5 and 6) and after (FIG. 7) the pipe assembly is formed by the pipe 13, spline 21 and tubular body 51. In some examples, tension can be applied to the pipe assembly, such that the spline 21 engages in the spline groove 19 at the shallowest radial depth 25. In another example, the spline 21 is configured to radially expand when it axially aligns with a spline groove 55 in the tubular member 51. The spline 21 can move axially and radially into a shallower portion or the shallowest radial depth 25 of the spline groove 19 when the pipe assembly is put in tension.

Figure 5:
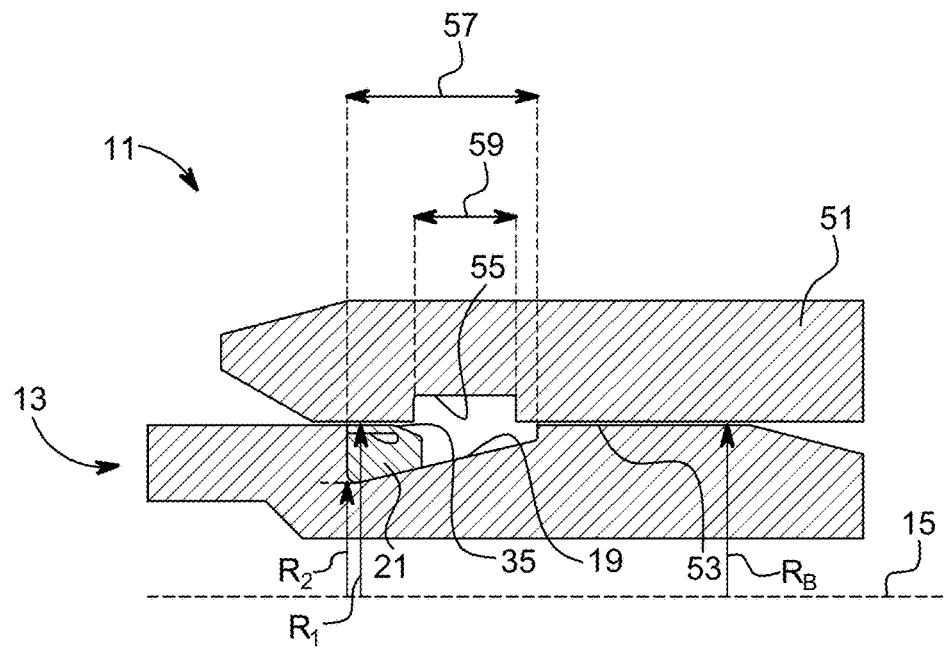
FIG. 5 is a sectional side view of an intermediate stage of assembly for the pipe assembly of FIG. 4.

Examples of the spline 21 can have a spline axial length 39 (FIG. 2) that is less than the spline groove axial length 57 (FIG. 5). In some embodiments, the spline axial length 39 is less than the spline groove axial length 57 by at least about 25%, such as at least about 50%, at least about 75%, or even at least about 100%. In other embodiments, the spline axial length 39 is less than the spline groove axial length 57 by not greater than about 250%, such as not greater than about 225%, not greater than about 200%, not greater than about 175%, or even not greater than about 150%. Other examples can include a range between any of these values.

In other versions, the spline groove axial length 57 can exceed the axial length 39 of the spline 21 by at least about 50%, such as at least about 75%, or even at least about 100%. The spline groove axial length 57 can exceed the axial length 39 of the spline 21 by not greater than about 500%, such as not greater than about 400%, or even not greater than about 300%. Other examples can include a range between any of these values.

Embodiments of a method of forming a pipe assembly also are disclosed. For example, the method can include providing a pipe 13 with an axis 15, an exterior 17, and a pipe spline groove 19 formed in the exterior 17. The method can include mounting a spline 21 (FIG. 4) in the pipe spline groove 19, and inserting the pipe 13 (FIG. 5) into an interior 53 of a tubular body 51 until the pipe spline groove 19 axially aligns (FIG. 6) with a tubular body spline groove 55 in the tubular body 51, such that at least a portion of the spline 21 extends into the tubular body spline groove 55. As shown in FIG. 6, an axial end 31 can abut a stop 61 in tubular member 51 to indicate full insertion of pipe 13 therein. In addition, the method can include axially removing (FIG. 7) at least a portion of the pipe 13 from the tubular body 51 such that an entirety of the spline 21 moves both axially and radially relative to the pipe spline groove 19.

Other embodiments of a method of forming a pipe assembly can include providing a pipe 13 having an axis 15, an exterior 17 and a pipe spline groove 19 formed in the exterior 17. A spline 21 can be mounted in the pipe spline groove 19. The spline 21 can include a base 33 and a tail 35 extending from a radial outer surface 37 of the base 33. The tail 35 of the spline 21 can radially extend from the base 33 prior to the pipe 13 contacting (FIG. 4) a tubular body 51. The method can include inserting the pipe 13 into the tubular body 51. The tubular body 51 can have an interior 53 and a tubular body spline groove 55 formed in the interior 53, such that the tail 35 of the spline 21 radially collapses toward the base 33 prior to the tail 35 reaching the tubular body spline groove 55. The method can further include axially aligning the pipe spline groove 19 (FIG. 6) with the tubular body spline groove 55, such that the tail 35 of the spline 21 again radially extends from the base 33. In addition, the method can include applying axial tension between the pipe 13 and the tubular body 51 such that the tail 35 of the spline 21 again radially collapses toward the base 33.

Another embodiment of a method can include providing a pipe 13 having an axis 15 and a spline groove 19 formed in an exterior 17 of the pipe 13; mounting a spline 21 in the spline groove 19, the spline 21 having a radial inner surface 38 that is not parallel to the axis 15, the radial inner surface 38 of the spline 21 can be the only radial inner surface of the spline 21; and inserting the pipe 13 into a tubular member 51 such than an entire axial length 39 of the radial inner surface 38 of the spline 21 is co-planar with a bottom 20 of the spline groove 19 of the pipe 13 before, during and after the pipe 13 is assembled to the tubular member 51.

Embodiments of a pipe system also are disclosed. The pipe system can have a pipe 13 with an axis 15 and a spline groove 19 formed in an exterior 17 of the pipe 13. A spline 21 can be configured to be mounted in the spline groove 19. The spline can include a radial inner surface 38 that is not parallel to the axis 15. The radial inner surface 38 of the spline 21 can be the only radial inner surface of the spline 21. In addition, an entire axial length 39 (FIG. 2) of the radial inner surface 38 of the spline 21 can be configured to be co-planar with the bottom 20 of the spline groove 19 before, during and after the pipe 13 is assembled to a tubular member 51.

Another embodiment of a pipe system can include a pipe 13 having an axis 15 and a spline groove 19 formed in an exterior 17 of the pipe 13. A major radial surface (i.e., bottom 20) of the spline groove 19 can be not parallel to the axis 15. The major radial surface (i.e., bottom 20) can include a spline groove axial length 57. A tubular body 51 can be configured to receive the pipe 13 to form a pipe assembly. The tubular body 51 can include an inner tubular body spline groove 55. A spline 21 can be configured to couple the pipe 13 to the tubular body 51 in the pipe assembly. The spline groove axial length 57 can exceed a spline axial length 39 of the spline 21 by at least about 25% and not greater than about 250%.

Examples of a pipe 13 can include a pipe body having an axis 15 and a spline groove 19 formed in an exterior 17 of the pipe body. The spline groove 19 can be configured to receive a spline 21. The spline groove 19 can consist of: a major radial surface (i.e., bottom 20) that is not parallel to the axis 15, and a shoulder 27, 29 on each axial end of the major radial surface (i.e., bottom 20).

Another embodiment of a pipe 13 can include a pipe body having an axis 15 and a spline groove 19 formed in an exterior 17 of the pipe body. The spline groove 19 can be configured to receive a spline 21. A major radial surface (i.e., bottom 20) of the spline groove 19 can be not parallel to the axis 15. In addition, the major radial surface (i.e., bottom 20) can comprise a spline groove axial length 57 that is configured to exceed an axial length 39 of the spline 21 by at least about 25% and not greater than about 250%.

Other versions can include one or more of the following embodiments:

Embodiment 1. A pipe assembly, comprising:
a pipe body having an axis and a spline groove formed in an exterior of the pipe body; and
a spline mounted in the spline groove, and an entirety of the spline is configured to be both axially movable and radially movable relative to the spline groove during formation of a pipe assembly with a tubular member.

Embodiment 2. The pipe of any of these embodiments, wherein the spline groove comprises a plurality of radial depths relative to the axis.

Embodiment 3. The pipe of any of these embodiments, wherein the spline groove is located adjacent an axial end of the pipe body, the spline groove comprises a deepest radial depth located farthest from the axial end, a shallowest radial depth located axially between the axial end and the deepest radial depth, and the deepest radial depth is greater than the shallowest radial depth.

Embodiment 4. The pipe of any of these embodiments, wherein the spline is configured to comprise:
a collapsed configuration having a collapsed diameter relative to the axis prior to formation of the pipe assembly with the tubular member;
an expanded configuration having an expanded diameter relative to the axis during formation of the pipe assembly, and the expanded diameter is greater than the collapsed diameter; and
another collapsed configuration having the collapsed diameter after formation of the pipe assembly.

Embodiment 5. The pipe of any of these embodiments, wherein in response to tension being applied to the pipe assembly, the spline is configured to engage in the spline groove at a shallowest radial depth thereof.

Embodiment 6. The pipe of any of these embodiments, wherein the spline is configured to:
radially expand when it axially aligns with a second spline groove in the tubular member; and
move axially and radially into a shallower portion of the spline groove when the pipe assembly is put in tension.

Embodiment 7. The pipe of any of these embodiments, wherein the spline groove has an axial length that is greater than a tubular member spline groove axial length in the tubular member.

Embodiment 8. The pipe of any of these embodiments, wherein the spline has a radial inner surface that is not parallel to the axis.

Embodiment 9. The pipe of any of these embodiments, wherein the radial inner surface of the spline is not parallel to the axis before, during and after the pipe assembly is formed with the tubular member.

Embodiment 10. The pipe of any of these embodiments, wherein the radial inner surface of the spline is an only radial inner surface of the spline, and an entire axial length of said only radial inner surface of the spline is co-planar with the spline groove of the pipe before, during and after the pipe assembly is formed with the tubular member.

Embodiment 11. The pipe of any of these embodiments, wherein an entirety of the radial inner surface of the spline is tapered.

Embodiment 12. The pipe of any of these embodiments, wherein an entirety of the radial inner surface of the spline is tapered at a single slope.

Embodiment 13. The pipe of any of these embodiments, wherein the spline groove in the pipe body consists of a tapered major surface and a shoulder on each axial end of the tapered major surface.

Embodiment 14. The pipe of any of these embodiments, wherein an entirety of the tapered major surface is tapered.

Embodiment 15. The pipe of any of these embodiments, wherein an entirety of the tapered major surface is tapered at a single slope.

Embodiment 16. The pipe of any of these embodiments, wherein the spline has a spline axial length that is less than a spline groove axial length by at least about 25% and not greater than about 250%.

Embodiment 17. The pipe of any of these embodiments, wherein the tubular member is one of another pipe and a coupling.

Embodiment 18. A pipe system, comprising:
a pipe having an axis, an exterior, a pipe spline groove formed in the exterior, a spline mounted in the pipe spline groove, and an entirety of the spline is configured to be both axially movable and radially movable relative to the pipe spline groove during formation of a pipe assembly; and
a tubular body having an interior configured to receive the pipe, the tubular body having a tubular body spline groove configured to receive at least a portion of the spline when the pipe assembly is formed.

Embodiment 19. The pipe system of any of these embodiments, wherein the tubular body is another pipe or a coupling.

Embodiment 20. A method of forming a pipe assembly, the method comprising:
(a) providing a pipe with an axis, an exterior, and a pipe spline groove formed in the exterior;
(b) mounting a spline in the pipe spline groove;
(c) inserting the pipe into an interior of a tubular body until the pipe spline groove axially aligns with a tubular body spline groove in the tubular body, such that at least a portion of the spline extends into the tubular body spline groove; and then
(d) axially removing at least a portion of the pipe from the tubular body such that an entirety of the spline moves both axially and radially relative to the pipe spline groove.

Embodiment 21. A pipe system, comprising:
a pipe having an axis, an exterior and a pipe spline groove formed in the exterior;
a spline mounted in the pipe spline groove, the spline having a base and a tail extending from a radial outer surface of the base;
a tubular body having an interior and a tubular body spline groove formed in the interior, wherein the tubular body is configured to form a pipe assembly with the pipe; and
wherein:
the tail of the spline is configured to radially extend from the base prior to the pipe contacting the tubular body;
the tail of the spline is configured to radially collapse toward the base after the pipe contacts the tubular body but prior to the tail reaching the tubular body spline groove;
the tail of the spline is configured to again radially extend from the base when the tail axially aligns with the tubular body spline groove; and
the tail of the spline is configured to again radially collapse toward the base when tension is applied between the pipe and the tubular body.

Embodiment 22. A method of forming a pipe assembly, the method comprising:
(a) providing a pipe having an axis, an exterior and a pipe spline groove formed in the exterior, and a spline mounted in the pipe spline groove, the spline having a base and a tail extending from a radial outer surface of the base, and the tail of the spline radially extends from the base prior to the pipe contacting a tubular body;
(b) inserting the pipe into the tubular body, the tubular body having an interior and a tubular body spline groove formed in the interior, such that the tail of the spline radially collapses toward the base prior to the tail reaching the tubular body spline groove;
(c) axially aligning the pipe spline groove with the tubular body spline groove, such that the tail of the spline again radially extends from the base; and then
(d) applying tension between the pipe and the tubular body such that the tail of the spline again radially collapses toward the base.

Embodiment 23. A pipe system, comprising:
a pipe having an axis and a spline groove formed in an exterior of the pipe; and
a spline configured to be mounted in the spline groove, the spline has a radial inner surface that is not parallel to the axis, the radial inner surface of the spline is the only radial inner surface of the spline, and an entire axial length of the radial inner surface of the spline is configured to be co-planar with the spline groove of the pipe before, during and after the pipe is assembled to a tubular member.

Embodiment 24. A method, comprising:
(a) providing a pipe having an axis and a spline groove formed in an exterior of the pipe;
(b) mounting a spline in the spline groove, the spline having a radial inner surface that is not parallel to the axis, the radial inner surface of the spline is the only radial inner surface of the spline; and
(c) inserting the pipe into a tubular member such than an entire axial length of the radial inner surface of the spline is co-planar with the spline groove of the pipe before, during and after the pipe is assembled to the tubular member.

Embodiment 25. A pipe, comprising:
a pipe body having an axis, a spline groove formed in an exterior of the pipe body, the spline groove is configured to receive a spline, and the spline groove consists of: a major radial surface that is not parallel to the axis, and a shoulder on each axial end of the major radial surface.

Embodiment 26. A pipe, comprising:

a pipe body having an axis, a spline groove formed in an exterior of the pipe body, the spline groove is configured to receive a spline, a major radial surface of the spline groove is not parallel to the axis, and the major radial surface comprises a spline groove axial length that is configured to exceed an axial length of the spline by at least about 25% and not greater than about 250%.

Embodiment 27. The pipe of any of these embodiments, wherein the spline groove axial length is configured to exceed the axial length of the spline by at least about 50%, at least about 75%, or at least about 100%.

Embodiment 28. The pipe of any of these embodiments, wherein the spline groove axial length is configured to exceed the axial length of the spline by not greater than about 500%, not greater than about 400%, or not greater than about 300%.

Embodiment 29. A pipe system, comprising:

a pipe having an axis and a spline groove formed in an exterior of the pipe, a major radial surface of the spline groove is not parallel to the axis, and the major radial surface comprises a spline groove axial length;

a tubular body configured to receive the pipe to form a pipe assembly, and the tubular body has an inner tubular body spline groove; and a spline configured to couple the pipe to the tubular body in the pipe assembly, and the spline groove axial length exceeds a spline axial length of the spline by at least about 25% and not greater than about 250%.

Embodiment 30. A pipe system, comprising:

a pipe having an axis and a spline groove formed in an exterior of the pipe; and a retainer configured to be mounted in the retainer groove, and an entirety of the retainer is configured to be both axially movable and radially movable relative to the retainer groove during formation of a pipe assembly with a tubular body.

Embodiment 31. The pipe system of any of these embodiments, wherein the retainer groove comprises a plurality of radial depths relative to the axis.

Embodiment 32. The pipe system of any of these embodiments, wherein the retainer groove is located adjacent an axial end of the pipe, the retainer groove comprises a deepest radial depth located farthest from the axial end, a shallowest radial depth located axially between the axial end and the deepest radial depth, and the deepest radial depth is greater than the shallowest radial depth.

Embodiment 33. The pipe system of any of these embodiments, wherein the retainer is configured to comprise:

a collapsed configuration having a collapsed diameter relative to the axis prior to formation of the pipe assembly with the tubular body;

an expanded configuration having an expanded diameter relative to the axis during formation of the pipe assembly, and the expanded diameter is greater than the collapsed diameter; and another collapsed configuration having the collapsed diameter after formation of the pipe assembly.

Embodiment 34. The pipe system of any of these embodiments, wherein in response to tension being applied to the pipe assembly, the retainer is configured to engage in the retainer groove at a shallowest radial depth thereof.

Embodiment 35. The pipe system of any of these embodiments, wherein the retainer is configured to:

radially expand when it axially aligns with a second retainer groove in the tubular body; and move axially and radially into a shallower portion of the retainer groove when the pipe assembly is put in tension.

Embodiment 36. The pipe system of any of these embodiments, wherein, at an initial stage of forming the pipe assembly, the retainer is configured to comprise:

an initial, outer collapsed radius ($R_1$), relative to the axis, that is greater than or equal to a bore radius ($R_B$) of the tubular body; and an initial, inner radius ($R_2$) that is less than or equal to the bore radius ($R_B$).

Embodiment 37. The pipe system of any of these embodiments, wherein, at an intermediate stage of forming the pipe assembly, the retainer is configured to comprise:

an outer, expanded radius ($R_3$) that is greater than or equal to a bore radius ($R_B$) of the tubular body; and an inner radius ($R_4$) that is less than or equal to the bore radius ($R_B$).

Embodiment 38. The pipe system of any of these embodiments, wherein, at a final stage of forming the pipe assembly, the retainer is configured to comprise:

a final, outer collapsed radius ($R_5$) that is greater than or equal to a bore radius ($R_B$) of the tubular body; and an inner radius ($R_6$) that is less than or equal to the bore radius ($R_B$)

Embodiment 39. The pipe system of any of these embodiments, wherein the retainer has a radial inner surface that is not parallel to the axis.

Embodiment 40. The pipe system of any of these embodiments, wherein the radial inner surface of the retainer is an only radial inner surface of the retainer, and an entire axial length of said only radial inner surface of the retainer is co-planar with the retainer groove of the pipe before, during and after the pipe assembly is formed with the tubular body.

Embodiment 41. The pipe system of any of these embodiments, wherein an entirety of the radial inner surface of the retainer is tapered.

Embodiment 42. The pipe system of any of these embodiments, wherein the retainer groove in the pipe consists of a tapered major surface and a shoulder on each axial end of the tapered major surface.

Embodiment 43. The pipe system of any of these embodiments, wherein the tubular body is one of another pipe and a coupling.

Embodiment 44. The pipe system of any of these embodiments, wherein an entirety of the radial inner surface of the retainer is tapered at a single slope.

Embodiment 45. The pipe system of any of these embodiments, wherein the retainer has a retainer axial length that is less than a retainer groove axial length by at least about 25% and not greater than about 250%.

Embodiment 46. A pipe system, comprising:

a pipe having an axis, an exterior, a pipe retainer groove formed in the exterior, a retainer configured to be mounted in the pipe retainer groove, and an entirety of the retainer is configured to be both axially movable and radially movable relative to the pipe retainer groove during formation of a pipe assembly; and a tubular body having an interior configured to receive the pipe, the tubular body having a tubular body retainer groove configured to receive at least a portion of the retainer when the pipe assembly is formed, and the tubular body is another pipe or a coupling.

Embodiment 47. A pipe system, comprising:

a pipe having an axis, an exterior and a pipe retainer groove formed in the exterior;

a retainer configured to be mounted in the pipe retainer groove, the retainer having a base and a tail extending from a radial outer surface of the base;

a tubular body having an interior and a tubular body retainer groove formed in the interior, wherein the tubular body is configured to form a pipe assembly with the pipe; and wherein:

the tail of the retainer is configured to radially extend from the base prior to the pipe contacting the tubular body;

the tail of the retainer is configured to radially collapse toward the base after the pipe contacts the tubular body but prior to the tail reaching the tubular body retainer groove;

the tail of the retainer is configured to again radially extend from the base when the tail axially aligns with the tubular body retainer groove; and the tail of the retainer is configured to again radially collapse toward the base when tension is applied between the pipe and the tubular body.

Embodiment 48. A method of forming a pipe assembly, the method comprising:

(a) providing a pipe having an axis, an exterior and a pipe retainer groove formed in the exterior, and a retainer mounted in the pipe retainer groove, the retainer having a base and a tail extending from a radial outer surface of the base, and the tail of the retainer radially extends from the base prior to the pipe contacting a tubular body;

(b) inserting the pipe into the tubular body, the tubular body having an interior and a tubular body retainer groove formed in the interior, such that the tail of the retainer radially collapses toward the base prior to the tail reaching the tubular body retainer groove;

(c) axially aligning the pipe retainer groove with the tubular body retainer groove, such that the tail of the retainer again radially extends from the base; and then (d) applying tension between the pipe and the tubular body such that the tail of the retainer again radially collapses toward the base.

Embodiment 49. A pipe, comprising:

a pipe having an axis, a retainer groove formed in an exterior of the pipe, the retainer groove is configured to receive a retainer, and the retainer groove consists of: a major radial surface that is not parallel to the axis, and a shoulder on each axial end of the major radial surface, wherein the shoulders extend in radial directions and are perpendicular to the axis.

This written description uses examples to disclose the embodiments, including the best mode, and also to enable those of ordinary skill in the art to make and use the invention. The patentable scope is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

Note that not all of the activities described above in the general description or the examples are required, that a portion of a specific activity may not be required, and that one or more further activities can be performed in addition to those described. Still further, the order in which activities are listed are not necessarily the order in which they are performed.

In the foregoing specification, the concepts have been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

It can be advantageous to set forth definitions of certain words and phrases used throughout this patent document. The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items can be used, and only one item in the list can be needed. For example, "at least one of: A, B, and C" includes any of the following combinations: A, B, C, A and B, A and C, B and C, and A and B and C.

Also, the use of "a" or "an" are employed to describe elements and components described herein. This is done merely for convenience and to give a general sense of the scope of the invention. This description should be read to include one or at least one and the singular also includes the plural unless it is obvious that it is meant otherwise.

The description in the present application should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

After reading the specification, skilled artisans will appreciate that certain features are, for clarity, described herein in the context of separate embodiments, may also be provided in combination in a single embodiment. Conversely, various features that are, for brevity, described in the context of a single embodiment, may also be provided separately or in any subcombination. Further, references to values stated in ranges include each and every value within that range.

What is claimed is:

1. A pipe system comprising:
a pipe having an axis and a retainer groove formed in an exterior of the pipe near an axial end of the pipe;
a tubular body having an interior and one end sized to receive the axial end of the pipe therein to form a pipe assembly; and
a retainer configured to be received in the retainer groove, wherein the retainer is configured to be both axially movable and radially movable relative to the retainer groove during formation of the pipe assembly and to retain the pipe and the tubular body in the pipe assembly,
wherein the retainer includes a base and a tail extending from a radial outer surface of the base, and
wherein the tail is configured to radially extend from the base and radially collapse toward the base to permit formation of the pipe assembly when collapsed and retain the pipe assembly when extended.

2. The pipe system of claim 1, wherein the retainer groove comprises a plurality of radial depths relative to the axis.

3. The pipe system of claim 2, wherein the retainer groove is located adjacent or near the axial end of the pipe, wherein the retainer groove has a deepest radial depth located farthest from the axial end, a shallowest radial depth located axially between the axial end and the deepest radial depth, and wherein the deepest radial depth is greater than the shallowest radial depth.

4. The pipe system of claim 3, wherein the retainer is reconfigurable among a collapsed configuration having a collapsed diameter relative to the axis and an expanded configuration having an expanded diameter relative to the axis, the expanded diameter is greater than the collapsed diameter.

5. The pipe system of claim 4, wherein in response to tension being applied to the pipe assembly, the retainer is configured to engage in the retainer groove at a shallowest radial depth thereof.

6. The pipe system of claim 4, wherein the tubular body includes a second retainer groove on the interior thereof, and wherein the retainer is configured to radially expand when axially aligned with the second retainer groove in the tubular body to move axially and radially into the shallowest radial depth of the retainer groove when the pipe assembly is under tension.

7. The pipe system of claim 1, wherein, at an initial stage of forming the pipe assembly, the retainer is configured to have an initial, outer collapsed radius ($R_1$), relative to the axis, that is greater than or equal to a bore radius ($R_B$) of the interior of the tubular body, and is configured to have an initial, inner radius ($R_2$) that is less than or equal to the bore radius ($R_B$).

8. The pipe system of claim 1, wherein, at an intermediate stage of forming the pipe assembly, the retainer is configured to have an outer, expanded radius ($R_3$) that is greater than or equal to a bore radius ($R_B$) of the interior of the tubular body, and is configured to have an inner radius ($R_4$) that is less than or equal to the bore radius ($R_B$).

9. The pipe system of claim 1, wherein, at a final stage of forming the pipe assembly, the retainer is configured to have a final, outer collapsed radius ($R_5$) that is greater than or equal to a bore radius ($R_B$) of the tubular body, and is configured to have an inner radius ($R_6$) that is less than or equal to the bore radius ($R_B$).

10. The pipe system of claim 1, wherein the retainer has a radial inner surface that is not parallel to the axis.

11. The pipe system of claim 10, wherein the radial inner surface of the retainer is an only radial inner surface of the retainer, and an entire axial length of the only radial inner surface of the retainer is co-planar with a surface of the retainer groove of the pipe before, during and after the pipe assembly is formed with the tubular body.

12. The pipe system of claim 10, wherein an entirety of the radial inner surface of the retainer is tapered.

13. The pipe system of claim 1, wherein the retainer groove in the exterior of the pipe consists of an angled major surface and a shoulder on each axial end of the angled major surface.

14. The pipe system of claim 1, wherein the tubular body is one of another pipe or a coupling.

15. The pipe system of claim 1, wherein an entirety of a radial inner surface of the retainer is oriented at an angle relative to the axis of the pipe, and wherein an angled major surface of the retainer groove is oriented at an angle relative to the axis of the pipe and that matches the angle of the radial inner surface of the retainer.

16. The pipe system of claim 1, wherein the retainer has a retainer axial length that is less than a retainer groove axial length by at least about 25% and not greater than about 250%.

17. A pipe system comprising:
a pipe having an axis, an exterior, and a retainer groove formed in the exterior;
a retainer configured to be mounted in the retainer groove, wherein an entirety of the retainer is configured to be both axially movable and radially movable relative to the retainer groove during formation of a pipe assembly; and
a tubular body having an interior configured to receive the pipe to form the pipe assembly, the tubular body having a second retainer groove on the interior and configured to receive at least a portion of the retainer when the pipe assembly is formed,
wherein the tubular body is another pipe or a coupling,
wherein the retainer includes a base and a tail extending from a radial outer surface of the base, and
wherein the tail is configured to radially extend from the base and radially collapse toward the base to permit formation of the pipe assembly when collapsed and retain the pipe assembly when extended.

18. The pipe system of claim 17, wherein the retainer groove includes a plurality of radial depths relative to the axis, wherein the retainer groove is located adjacent an axial end of the pipe, and wherein the retainer groove includes a deepest radial depth located farthest from the axial end, a shallowest radial depth located axially between the axial end and the deepest radial depth, and the deepest radial depth is greater than the shallowest radial depth.

19. The pipe system of claim 18, wherein in response to tension being applied to the pipe assembly, the retainer is configured to engage in the retainer groove at the shallowest radial depth.

20. A pipe system of claim 17, wherein
the tail is configured to radially extend from the base prior to the pipe contacting the tubular body to form the pipe assembly,
wherein the tail is configured to radially collapse toward the base after the pipe contacts the tubular body but prior to the tail reaching the second retainer groove,
wherein the tail is configured to radially extend from the base when the tail axially aligns with the second retainer groove, wherein the tail is configured to radially collapse toward the base when tension is applied between the pipe and the tubular body such that the base bears against a surface in the retainer groove and against a surface in the second retainer groove to retain the pipe and the tubular body in the pipe assembly.

\* \* \* \* \*